Patented June 16, 1925.

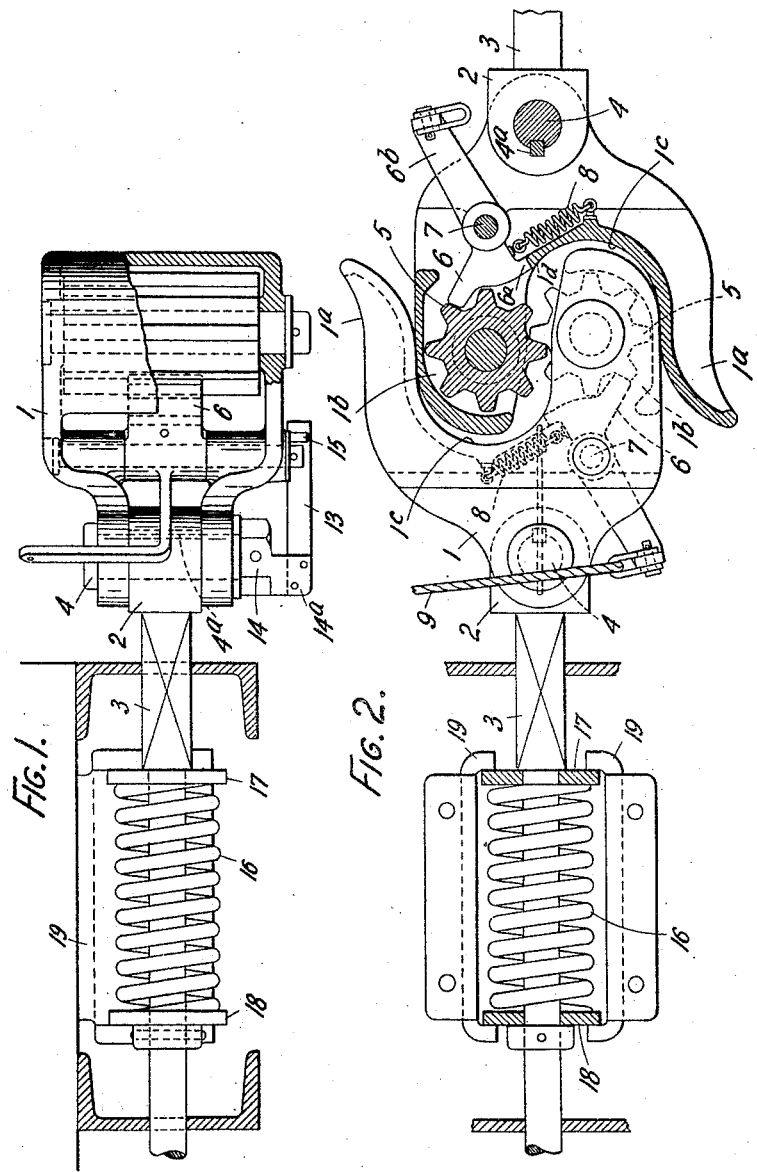

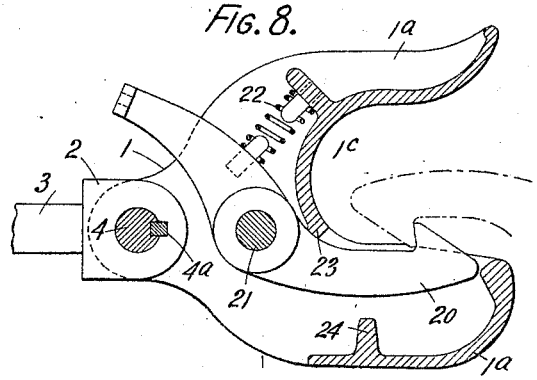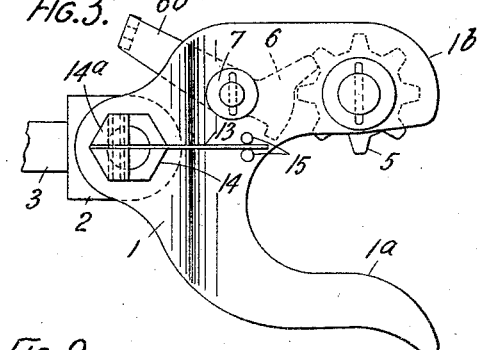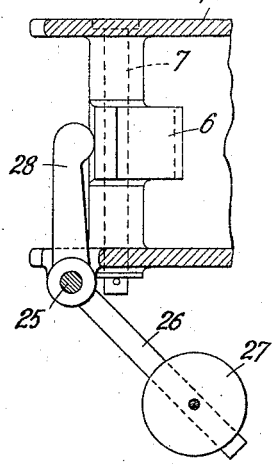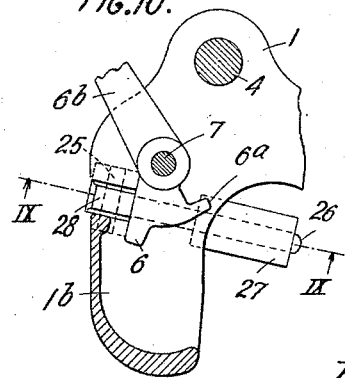

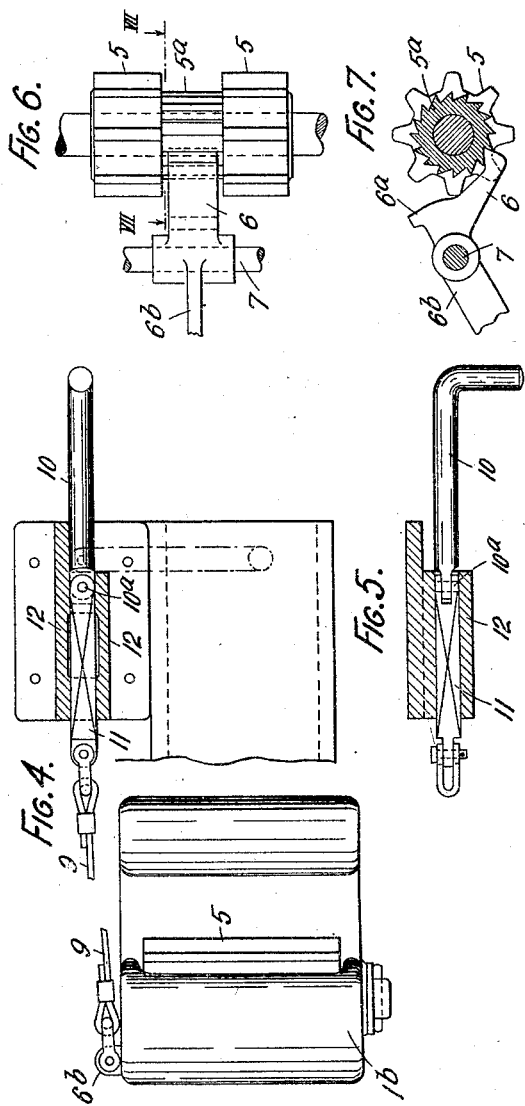

1,542,211

UNITED STATES PATENT OFFICE.

WILHELM G. BOONZAIER, OF LONDON, ENGLAND; IRENE KATHLEEN HOLLAND AND GREGORIO JOHN BOONZAIER, EXECUTORS OF SAID WILHELM G. BOONZAIER, DECEASED.

COUPLING FOR RAILWAY OR OTHER VEHICLES.

Application filed August 15, 1923. Serial No. 657,620.

*To all whom it may concern:*

Be it known that I, WILHELM GOERT BOONZAIER, a subject of the King of England, residing at London, England, have invented certain new and useful Improvements in Couplings for Railway or Other Vehicles, of which the following is a specification.

This invention relates to automatic couplings for railway or other vehicles, more particularly to coupling devices of the interlocking type as distinct from those of the hook and link description.

The invention has for one of its objects to provide improved means for automatically effecting reliable coupling of the vehicles when they come together, while enabling release of the interlocking members to be effected from the side of the vehicle.

According to this invention each coupling unit comprises a jaw, hereinafter to be called the coupling head, consisting of forwardly projecting arms providing a recess forming a concave buffer, somewhat of a half circular shape, and having preferably a rearward extension or shank, which may form part of the drawbar, or may be pivoted to the drawbar arranged on the underside of the vehicle, or the drawbar may be provided with a head pivoted to the said shank, or the coupling head may be without a shank and pivoted directly on the end of the drawbar. One of the arms of the coupling head acts as a guide member, the other arm carrying a locking member, which may be in the form of a toothed wheel, hereinafter to be called the coupling member, arranged to turn on a vertical pivot or axis, and the said coupling member may have associated with it a pin, pawl, or other means for automatically securing the coupling member, when turned into its locking position. Each coupling member has a tooth or locking portion which projects into the space between the arms, towards the opposite arm, so that when two wagons or vehicles provided with my coupling come together, the arm carrying the coupling member of one coupling unit enters the opening or recess of the other and the two coupling members interengage and turn about their pivots or axes into locking position, their pawls thereupon coming into action and preventing disengagement of the coupling, until one or both pawls or securing means are disengaged by the operation of a lever, rod, chain or the like. Preferably the pinions are so positioned that they are out of centre with each other, in the coupled positions, thus ensuring effective maintenance of their engaging teeth, instantaneous and secure locking action, and the largest possible contact and wearing surfaces.

As an alternative to the toothed wheel, the coupling member may be in the form of a pivoted hook having an inclined or sloping outer surface, the hook projecting into the recess in the coupling head in such manner that when two couplings come together the inclined heads of their locking hooks will make contact and slide one upon the other until they snap over into locking position. A spring may act upon the tail of each hook to press its head into operative position in the recess, a rod, chain or other connection being used to effect the disengagement when required.

The accompanying drawings illustrate, by way of example, a construction of a coupling and modification of various details embodying the invention.

Fig. 1 is an elevation of an arrangement of a complete coupling unit with drawbar and, Fig. 2 is a plan thereof, showing, in addition, in a sectional plan the coupling unit of a coupled vehicle in engagement therewith, while, Fig. 3 is an underside view of such a coupling unit, Fig. 4 is a front elevation, and, Fig. 5 a sectional plan showing the means for releasing the couplings.

Fig. 6 shows in elevation and,

Fig. 7 in horizontal section a modified form of a coupling and its locking member, while, Fig. 8 shows a modified construction of coupling head, Fig. 9 shows in sectional elevation on the line IX—IX of Fig. 10, and, Fig. 10 in a sectional plan, a gravity device in place of a spring for maintaining the coupling member in its operative position.

The coupling unit shown in Figs. 1, 2 and 3 comprises a coupling head 1 supported on the head 2 of the drawbar 3 to which it is pivotally connected so as to swing about a vertical axis, by means of a bolt 4. The said coupling head 1 has laterally two forwardly extending jaws 1ª and 1ᵇ which between them form a buffer recess 1ᶜ, wherein the jaw 1ᵇ of the opposed coupling head enters. The jaws 1ª are curved outwardly thereby functioning as guides to the jaws 1ᵇ when the two couplings come together, and also acting to retain the parts in coupled position and prevent accidental uncoupling.

The coupling head 1 is substantially formed as a casing or support in or on which the coupling member proper is mounted. In its jaw 1ᵇ is mounted on a vertical axis a pinion or toothed wheel 5, which constitutes the coupling member, one or more of the teeth of which project into the recess 1ᶜ to such an extent that a vertical plane through the axis of the drawbar 3 and the pivotal axis of the coupling head 1 is at a tangent to the pitch circle of the pinion 5, while the width of the recess is such that when two jaws interengage, the said vertical planes coincide and the teeth of the pinions 5 of the two units will be in correct mesh (Fig. 2). The teeth of the pinions 5 are given a substantially straight profile so that, when in mesh, their flanks are in close contact substantially over the whole depth of the teeth.

A pawl 6, pivoted on a bolt 7, is so arranged that while allowing the pinions 5 upon meeting to cause each other to rotate freely, said pawl, once the pinions have passed each other, will prevent them from rotating in the opposite direction (clockwise in Fig. 2) so that the engaged teeth of the pinions constitute the actual coupling members. The pawl is maintained in its locking position by means of a spring 8 and is provided with a nose 6ª adapted to rest against an abutment 1ᵈ formed on the guide member 1, which abutment thus takes up the pressure of the coupling member 5 upon the pawl 6 and thereby relieves the bolt 7 from strain.

The pawl 6 is provided with a tail 6ᵇ which extends in the direction of the vehicle to which the coupling unit is attached and is connected by means of a chain or wire rope 9 to a handle 10 (Figs. 4 and 5) arranged close to its side on the end of the vehicle. The handle 10 is hinged to a bar 11 of square or rectangular cross section adapted to slide in guide 12 secured to the vehicle. Normally the hinge 10ª of the handle 10 is maintained within the guide 12 by the action of spring 8 on the pawl 6. When the handle is pulled outwardly so that the hinge 10ª is clear of guide 12 it may be turned down (as shown in broken lines Fig. 4) and thereby holds the pawl 6 out of engagement with its pinion 5.

The member 1 of such coupling unit is preferably formed by upper and lower plates which towards the front are connected by webs (Fig. 2) forming the contacting surfaces for the couplings when they come together, while towards the rear the space between the upper and lower plates is open and thus affords free access to the pawl 6 and the spring 8.

In order, normally to maintain the coupling unit in alignment with the drawbar, a flat spring 13 (Figs. 1 and 3) is mounted in wings 14ª of the nut 14 which secures the pivot bolt 4 of the coupling head 1, and at its other end is held between two pins 15 secured to the said coupling head. Instead of the pins 15 suitable lugs may be formed integrally with the coupling head 1. The bolt 4 is prevented from rotating by means of a feather or key 4ª provided in the head 2 of the drawbar.

The drawbar may be of the customary continuous type or it may be arranged as shown in Figs. 1 and 2. A compression spring 16, slid on the drawbar 3, is held at an initial tension between two blocks, collars or washers 17 and 18, rigidly mounted on the drawbar and slidably guided in and within the limits of a cradle 19, arranged at the underside of the vehicle. The spring 16 is by this arrangement adapted to act both against pull or push movements of the drawbar.

The operation is as follows:

When two vehicles, each fitted with one of the coupling units hereinbefore described, come together, the jaw 1ᵇ of each coupling head 1 enters the recess 1ᶜ of the opposed coupling head, the outwardly curved jaws 1ª acting as guide and positioning means, so that the units align themselves automatically in the horizontal direction by turning on their pivot bolts 4, whereby the pinions 5 engage each other and rotate until the forward ends of the jaws 1ᵇ which constitute buffer heads strike the bottom of the recesses 1ᶜ which constitute buffer faces. In this rotary movement the pawl or pawls 6 will click over the teeth of the respective pinions, but will prevent back rotation of the pinions 5 in the opposite direction. That is to say, the pawls will allow engagement to take place but prevent disengagement, so that the two units will be securely inter-locked and coupled.

The coupling units are of considerable height, say nine or ten inches and the coupling members, i. e., the teeth of the pinions 5 are correspondingly long, and being so arranged that they engage each other clear of the coupling heads 1, they are thus enabled to slide up and down on each other. Differences in the relative positions on a vertical direction, of the two units, whether due to difference of load or jolts sustained by the individual vehicle during running, will therefore not affect the reliability of coupling whether in the process of coupling or in the course of running.

To effect disengagement of the two units the tail 6ᵇ of pawl 6 of either one or the other unit may be operated by pulling the handle 10, whereby the pinion 5 of the particular unit is released and free to rotate, so that, although the pinion of the other unit may remain locked the two units are uncoupled.

When shunting operations, whereby the coupling units perform the functions of buffers, are contemplated, it is sufficient to unlock one of the coupling members or pinions 5, inasmuch, as has been seen, when one of these is free to rotate no coupling can be effected. In order therefore to maintain such pinion in its unlocked position the handle 10 after its hinge 10ª has been pulled clear of the guide 12 is turned down and thus holds the pawl 6 permanently out of engagement with its pinion until the handle is lifted, and the spring 8 becomes operative and draws the handle back into the guide 12. Incidentally, if in releasing the handle it should fail to be drawn back, this indicates that the spring 8 is inactive or the pawl obstructed.

According to a modified form, the pinions 5 might be constructed as shown in Figs. 6 and 7. The middle portion 5ª of the pinion 5 is reduced in diameter and provided with ratchet teeth of smaller pitch with which the pawl 6 engages so that thereby a quicker and more reliable locking of the pinion is obtained. The length of the reduced part 5ª should be less than one third of the total length of the pinion so that under any normal circumstances of vertical displacement of the cooperating coupling units the teeth of the pinions 5 will remain in engagement.

Fig. 8 shows an alternative construction of the coupling member. A pivoted hook 20 having an inclined or sloping outer surface takes the place of the pinion. Pivoted on a bolt 21 it is directly under the influence of a compression spring 22, and is held in such a position that the hook end projects into the recess 1ᶜ of the coupling head 1, while its movements are limited in one direction by an abutment 23 and in the other direction by an abutment 24 arranged in the coupling head 1. When two coupling units come together their hooks 20 will cause each other to move apart until their heads clear, when they will interlock each other (as indicated in broken lines Fig. 8) under the action of their springs. The release, temporarily or permanently is effected in an analogous manner to that described hereinbefore in connection with the example shown in Figs. 1 to 5 by means of the handle 10.

Instead of actuating the pawl 6 (Fig. 2) or the hook 20 (Fig. 8) by means of a spring, this may be effected by a gravity device, an example of such being shown in Figs. 9 and 10. A bell-crank lever pivoted at 25 below an opening in the lower plate of the guide member 1, through which it passes, carries on its lower arm 26 a weight 27 while its other arm 28 rests and presses against or is linked to the pawl 6 (or the hook 20 as the case may be) so that the said weight 27 always acts upon the said pawl (or hook) and holds it in operative position when not restrained by the operation of handle 10.

The device is shown as a central buffer coupling, but it may also be used as a coupling in connection with double buffers.

I claim as my invention:

1. An automatic coupling, comprising a coupling head having a pair of forwardly-extending arms providing a buffer recess between them; a pinion mounted in one arm and projecting into said recess to engage a similar pinion on the opposed coupling member; and a pawl pivotally mounted on the coupling head and having two separate locking portions, one for coaction with said pinion and the other for directly and simultaneously engaging a part of said head.

2. An automatic coupling, comprising a coupling head having a pair of forwardly-extending arms providing a buffer recess between them, and also having an abutment at the base of one arm; a pinion mounted in said arm and projecting into said recess to engage a similar pinion on the opposed coupling member; and a pawl pivotally mounted on the coupling head to directly engage a tooth of said pinion and having a nose spaced from its pinion-engaging portion and adapted to directly and simultaneously engage said abutment.

3. An automatic coupling, comprising a coupling head having a pair of forwardly-extending arms providing a buffer recess between them; a single pinion carried by the coupling head and mounted in one of its arms; said pinion projecting into said recess to engage a similar pinion on the opposed coupling member; and a pawl pivotally mounted on the coupling head and having two separate locking portions, one to directly engage a tooth of said pinion and the other to directly and simultaneously engage a part of said head.

In testimony whereof I have signed my name to this specification.

WILHELM G. BOONZAIER.

In the presence of—
 FRANK BLAKEY,
 LEWIS KITEY.